United States Patent

Itoh et al.

[11] Patent Number: 5,769,202
[45] Date of Patent: Jun. 23, 1998

[54] INSIDE-OUT CAN LID REMOVAL DEVICE

[75] Inventors: Hideo Itoh; Saburoh Itoh, both of Shizuoka-ken, Japan

[73] Assignee: Mitsubishi Materials Corporation, Tokyo, Japan

[21] Appl. No.: 844,780

[22] Filed: Apr. 22, 1997

Related U.S. Application Data

[63] Continuation of Ser. No. 309,989, Sep. 20, 1994, abandoned.

[51] Int. Cl.[6] .................................................. B65G 47/256
[52] U.S. Cl. .......................... 198/395; 198/416; 209/928
[58] Field of Search .................................. 198/395–398, 198/416; 209/928; 414/798.9

[56] References Cited

U.S. PATENT DOCUMENTS

| | | | |
|---|---|---|---|
| 3,079,012 | 2/1963 | Vincent | 414/798.9 |
| 3,426,921 | 2/1969 | Parshall | 414/798.9 |
| 4,655,350 | 4/1987 | Mojden et al. | 198/398 X |
| 4,938,649 | 7/1990 | Ter Horst et al. | 414/798.9 X |
| 4,977,998 | 12/1990 | Middeldorp | 198/395 |
| 5,145,050 | 9/1992 | Booher et al. | 198/395 |
| 5,226,518 | 7/1993 | Purcell et al. | 198/398 X |

FOREIGN PATENT DOCUMENTS 56-33953  8/1981  Japan.

*Primary Examiner*—Janice L. Krizek
*Attorney, Agent, or Firm*—Armstrong, Westerman, Hattori, McLeland & Naughton

[57] ABSTRACT

When an inside-out can lid is detected in a lid row, an abutting block mounted on a pneumatic cylinder moves upward. The abutting block passes through the inside of a through-hole and pushes up the lid row in a position near the inside-out can lid. Then, the inside-out can lid is popped out of the lid row upward and is removed from the lid row.

15 Claims, 6 Drawing Sheets

INSIDE-OUT CAN LID REMOVAL DEVICE

This application is a continuation of application Ser. No. 08/309,989 filed Sep. 20, 1994, now abandoned.

BACKGROUND OF THE INVENTION

1. Field of the Invention

The present invention relates to a device for removing an inside-out can lid from a row of can lids.

2. Description of the Related Art

In a known technique of manufacturing can lids such as illustrated in FIG. 7, a plurality of can lids 1 formed in a generally disk-like shape are stacked and closely contacted to each other to constitute a row of lids, which is then transferred on a transfer passage and supplied to a can lid seaming machine. In general, each of the can lids 1 comprises: a disk-like panel 1a; countersinks 1b formed continuously extending from the periphery of the panel 1a; curled portions 1c formed further continuously extending from the periphery of the countersinks 1b; and a tab 1d attached to the central portion of the panel 1a. Accordingly, in the state in which the can lids 1 are stacked, countersinks 1b of one lid 1 fills into the recesses formed by the countersinks 1b of the adjacent lid 1, thereby maintaining the state of the close contact of the curled portions 1c of the lids 1 adjacent to each other. Conventionally, the can lids 1 are transferred from upstream to downstream while being urged by a large force in the state in which the reliable contact of the can lids 1 is maintained.

Conventionally, unlike the normal can lids 1, a lid which is turned inside out (hereinafter referred to as the "inside-out can lid") is sometimes mixed in the lid row 2 (See FIG. 7). If such an inside-out can lid 3 is not removed but transferred to the seaming machine, inconveniences and adverse influences on the seaming machine may occur. For example, the seaming machine might not be able to perform the seaming operation.

As a means of removing such an inside-out can lid, as disclosed in Japanese Utility Model Publication No. 56-33953, a conventional technique is known where a hook is used to hook the curled portion 1c of the inside-out lid so as to remove the inside-out lid from the lid row. However, the above technique is not completely reliable.

SUMMARY OF THE INVENTION

Accordingly, an object of the present invention is to provide an inside-out can lid removal device which is capable of removing an inside-out can lid from a transfer passage by use of a simple mechanism.

To achieve the above object, the present invention provides an inside-out can lid removal device comprising: a transfer passage through which a row of can lids is transferred while being urged downstream; a detection mechanism placed in the neighborhood of the transfer passage; and an extrusion mechanism, when the detection mechanism detects an inside-out can lid, the extrusion mechanism extruding the row in a position near the inside-out lid.

The extrusion mechanism presses the row of can lids in a position near the inside-out lid, which then pops out from the lid row. According to the above operation, the inside-out lid can be removed from the row.

DETAILED DESCRIPTION OF THE PREFERRED EMBODIMENTS

Figure 1:
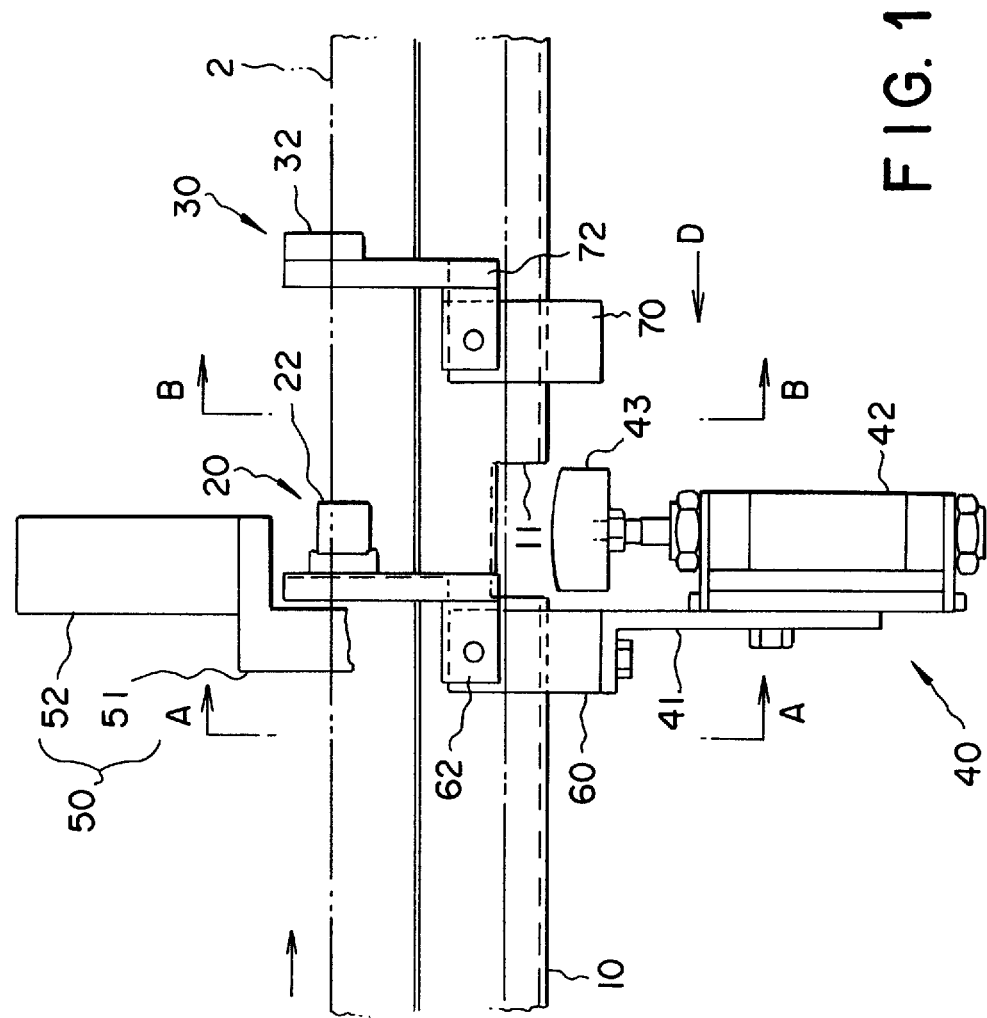
FIG. 1 is a side view of an inside-out can lid removal device of one embodiment according to the present invention.
Figure 2:
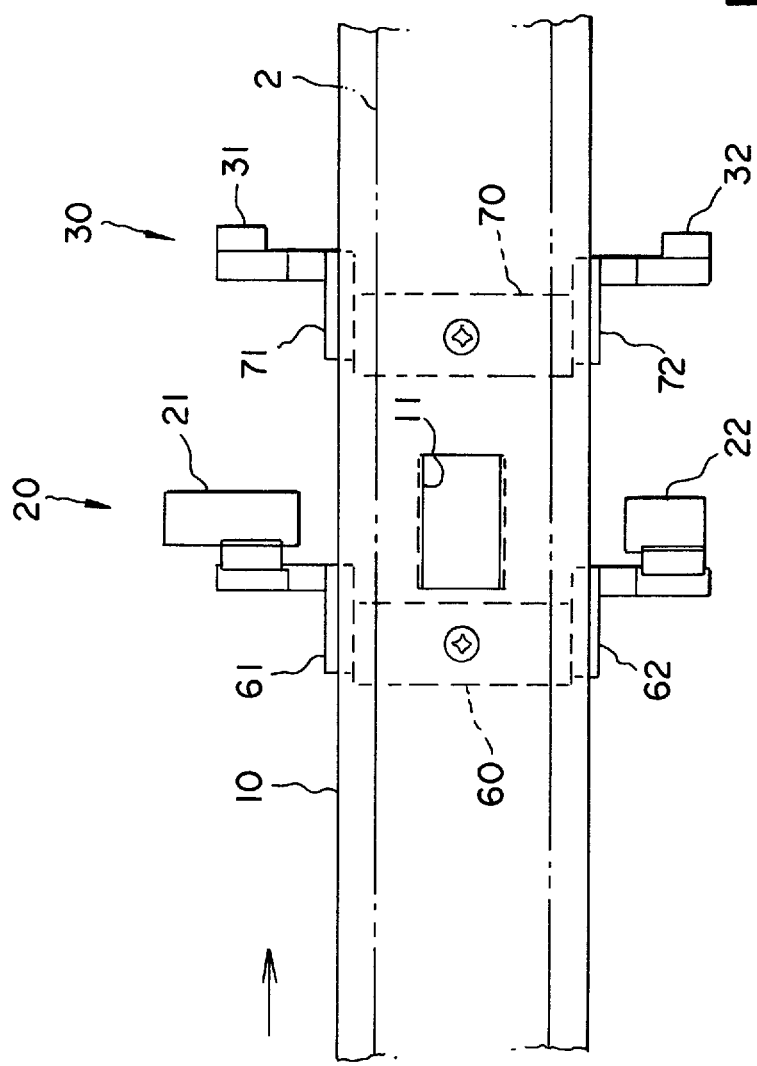
FIG. 2 is a plan view of the device shown in FIG. 1.

A description will be given of an inside-out can lid removal device according to one embodiment of the present invention. The same components as those described above are designated by like reference numerals, and a detailed explanation thereof will thus be omitted.

The removal device of the first embodiment mainly comprises: a transfer passage 10 through which a row of can lids is transferred; a first sensor generally denoted by 20 (detection mechanism) placed in the vicinity of the transfer passage 10 so as to detect the presence of an inside-out can lid 3; a second sensor generally denoted by 30 placed downstream of the first sensor 20; an extrusion mechanism 40, when the first sensor 20 detects the inside-out can lid 3, to extrude the row of can lids 2 in a position near the inside-out can lid 3; and a guide 50 placed in the neighborhood of the extrusion mechanism 40 so as to guide the inside-out can lid 3 which has been removed.

The transfer passage 10 is formed in an elongated trough-shape having a V-shape cross section. The rear end of the transfer passage 10 is connected to a seaming machine (not shown) to which the lid row 2 can be continuously supplied. The lid row placed on the transfer passage 10 is transferred while being pressed downstream, thereby maintaining the state of the close contact of the can lids to each other. The transfer passage 10 is provided with a vertical through-hole 11 above an abutting block 43 (described below) of the extrusion mechanism 40.

Figure 3:
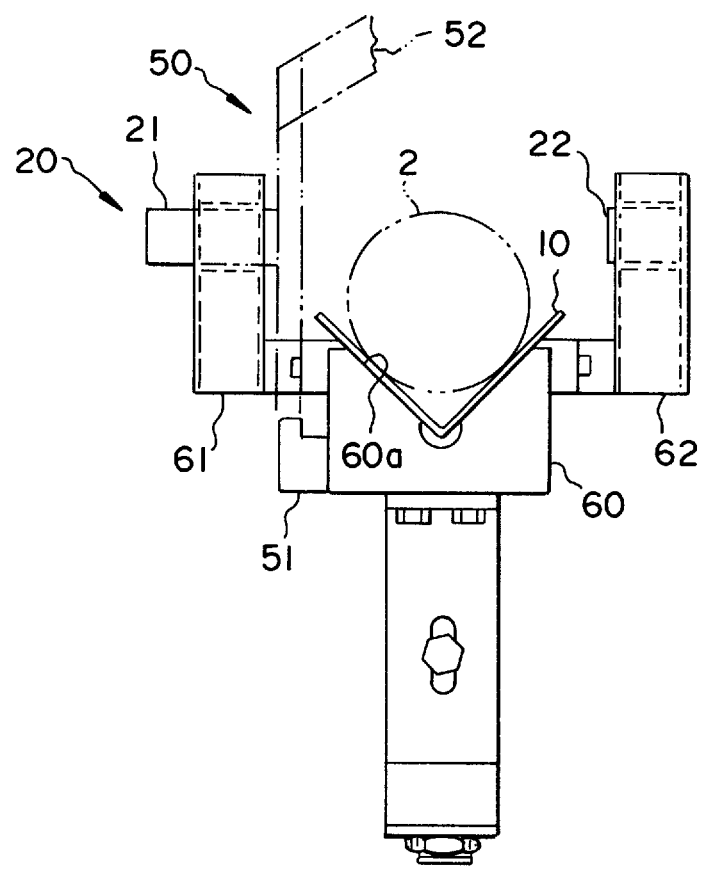
FIG. 3 is a sectional view along line A—A of FIG. 1.

A block 60 provided with a V-shaped groove 60a on the upper surface thereof is fixed to the bottom surface of the transfer passage 10 in a position slightly upstream of the through-hole 11 (See FIG. 3). Brackets 61 and 62 are attached to both lateral surfaces of the block 60. A phototransmitter 21 (described below) forming a part of the first sensor 20 is mounted on the top of the bracket 61, while a photoreceiver 22 (described below) forming another part of the first sensor 20 is mounted on the top of the bracket 62.

Figure 4:
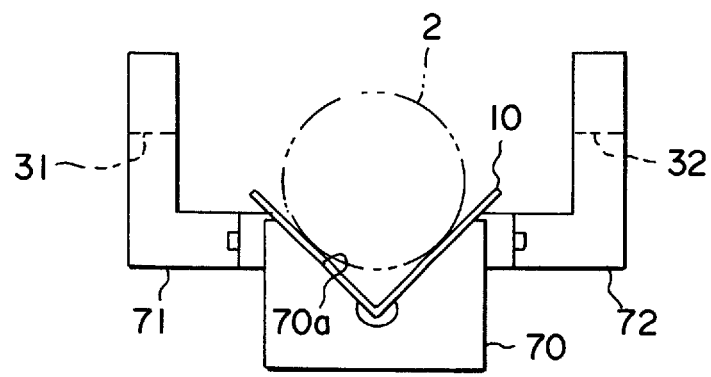
FIG. 4 is a sectional view along line B—B of FIG. 1.

A block 70 is provided with a V-shaped groove 70a on the upper surface thereof is fixed to the bottom surface of the transfer passage 10 in a position downstream of the through-hole 11 and upstream of the seaming machine (See FIG. 4). Brackets 71 and 72 are attached to both lateral surfaces of the block 70. A phototransmitter 31 (described below) forming a part of the second sensor 30 is mounted on the top of the bracket 71, while a photoreceiver 32 (described below) forming another part of the second sensor 30 is mounted on the top of the bracket 72.

A photo-sensor is used as the first sensor 20. As described above, the first sensor 20 consists of the phototransmitter 21 and the photoreceiver 22, both of which are placed above the extrusion mechanism 40 (See FIG. 1). The phototransmitter 21 is located so that it can apply light onto the path of the curled portion 1c of the can lid 1. More specifically, when the gap t formed between the curled portion 1c of the can lid 1 and the curled portion 3c of the inside-out can lid 3 passes by the phototransmitter 21, the light applied from the phototransmitter 21 passes through the gap t so that the photoreceiver 22 can detect such applied light. In response to the detection of the applied light by the photoreceiver 22, the control means manipulates a valve (not shown) connected to a pneumatic cylinder 42 (described below) of the extrusion mechanism 40 so that a rod can be projected from the pneumatic cylinder 42.

A photo-sensor comprising the phototransmitter 31 and the photoreceiver 32 is used as the second sensor 30, as well as the first sensor 20. When the gap t formed between the curled portion 1c of the can lid 1 and the curled portion 3c of the inside-out can lid 3 passes by the phototransmitter 31, the light applied from the phototransmitter 31 passes through the gap t so that the photoreceiver 32 can detect such applied light. The second sensor 30 is connected to the control means (not shown) to be adapted to cause an abrupt stop to the movement of the lid row 2 downstream when the photoreceiver 32 detects the applied light.

The extrusion mechanism 40 comprises: an L-shaped bracket 41 mounted on the bottom surface of the block 60; a pneumatic cylinder 42 fixed to the lateral surface of the bracket 41 and having a rod formed upward; and an abutting block 43 mounted on the top of the rod of the pneumatic cylinder 42. As stated above, the pneumatic cylinder 42 is adapted to project the rod based on a detection signal from the first sensor 20. The pneumatic cylinder 42 is also adapted to immediately return the rod to the original position after it projects the rod. The abutting block 43 is so sized as to pass through the inside of the through-hole 11 provided for the transfer passage 10. The top surface of the abutting block 43 forms a part of a cylindrical surface of which axis crosses at right angles with the axis of the lid row 2 (See FIGS. 1, 5 and 6).

Figure 5:
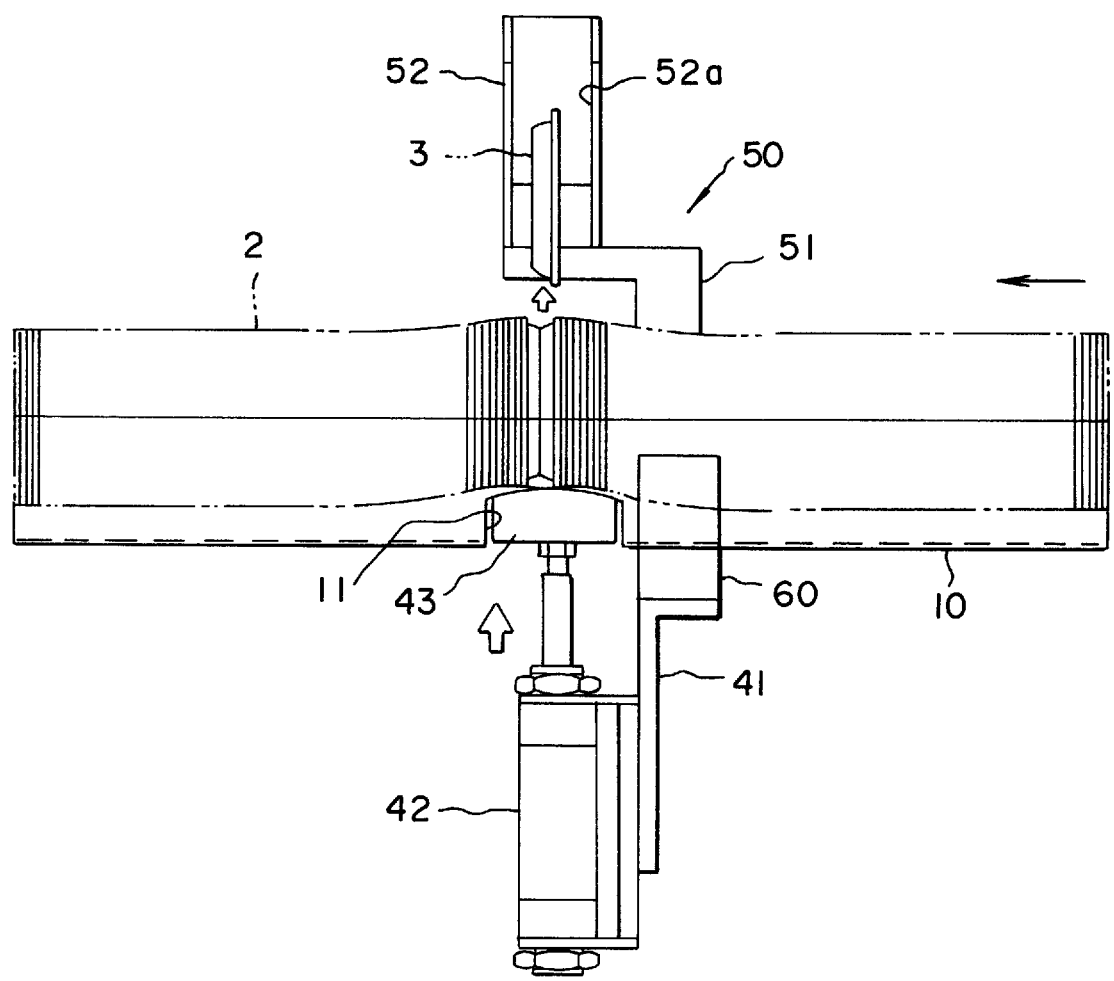
FIG. 5 illustrates the operation of the removal device of this embodiment as viewed in the direction of the arrow C in FIG. 6.
Figure 6:
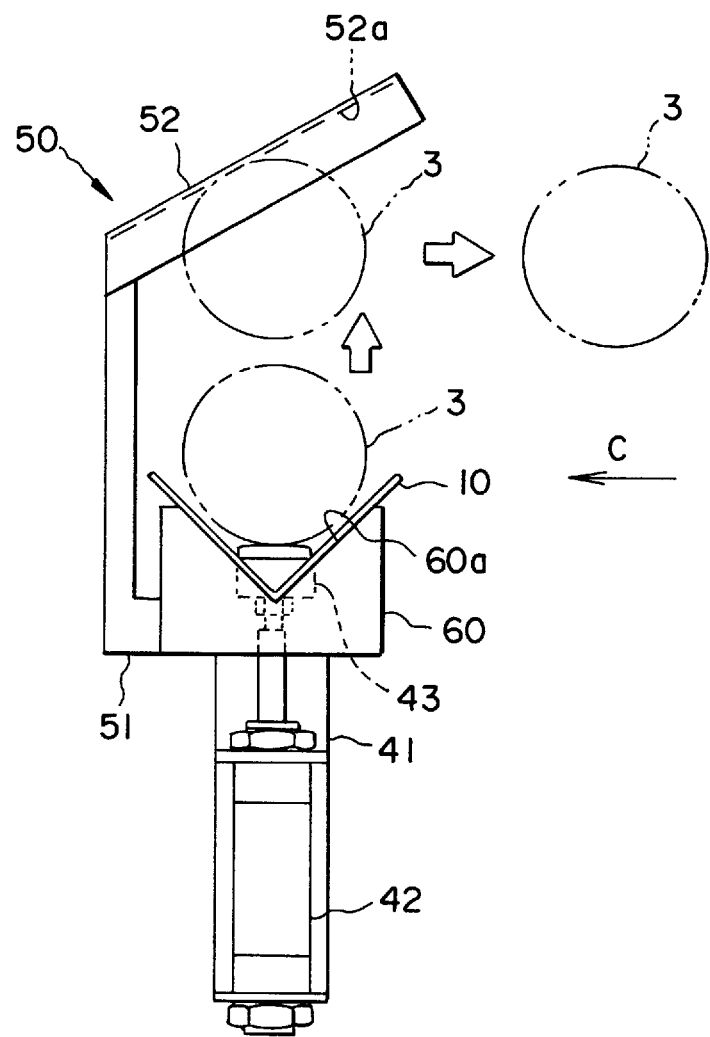
FIG. 6 illustrates the operation of the removal device of this embodiment and also shows portions of the device as viewed in the direction of the arrow D in FIG. 1.

The guide 50 comprises an upwardly-extending base 51 fixed to the lateral surface of the block 60 and a main body 52 continuously extending from the top of the base 51 (See FIG. 5). The main body 52 tilts with respect to the base 51 so that the bottom surface of the main body 52 abuts against the top surface of the lid row 2 (See FIG. 6). A guide groove 52a is longitudinally provided in the lower surface of the main body 52 so as to guide the discharged can lid 3.

The operation of the device of this embodiment will now be described. In normal times, the lid row 2 moves downstream (that is, toward the right-hand side of FIG. 1) to be supplied to the seaming machine. In the meantime, the light is continuously applied to the lid row 2 from the phototransmitter 21 of the first sensor 20 and the photoreceiver 31 of the second sensor 30. However, the light is screened by the lid row 2 so as not to reach the photoreceiver 22 and 32. Thus, a detection signal is not transmitted from the first and second sensors 20 and 30.

Figure 7:
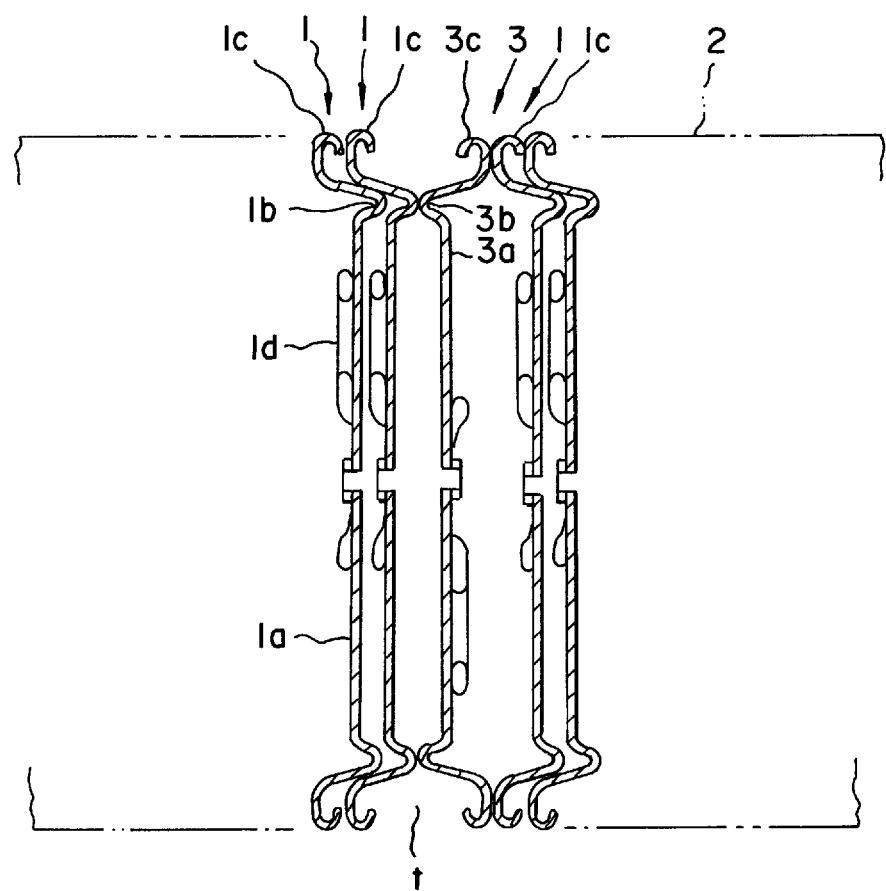
FIG. 7 is a schematic sectional view of a row of can lids.

When an inside-out can lid 3 is mixed in the lid row 2, the device of this embodiment is operated as follows. During the movement of the lid row 2, when the gap t formed between the normal can lid 1 and the inside-out can lid 3 is positioned in front of the phototransmitter 21, the light applied from the phototransmitter 21 passes through the gap t to reach the photoreceiver 22, which then transmits a signal to the control means. The control means actuates the valve connected to the pneumatic cylinder 42 so as to project the rod upward from the pneumatic cylinder 42. Then, the abutting block 43 mounted on the top of the rod moves upward and passes through the through-hole 11 so as to abut against the bottom surface of the lid row 2 and to slightly lift it (See FIG. 5). At the same time, the inside-out can lid 3 pops out of the lid row 2 in an upward direction (See FIGS. 5 and 6). This occurs because of the following reasons. As illustrated in FIG. 7, the inside-out can lid 3 is totally non-fitting with the normal lids. In other words, the vertical movement of the inside-out lid 3 does not interfere with the adjacent normal lids 1. Also, an axial pressing force (perpendicular to the upward force) is applied to the lid row 2. In such a state, when an upward force is applied to the lid row 2, a slight force having an upward component is also applied to the inside-out can lid 3, which is thus displaced upward. Because of the above operation, it is considered that the inside-out can lid 3 pops out upwardly due to an axial pressing force.

Thereafter, the inside-out can lid 3 collides with the bottom surface of the main body 52 of the guide 50 and moves laterally so as to drop onto the floor by gravity. The inside-out can lid 3 may drop into a storage area which has been arranged on the floor in advance. The pneumatic cylinder 42 immediately returns to the original position after it projects the abutting block 43.

As described above, the device of this embodiment can automatically remove the inside-out can lid 3 from the lid row 2, thereby preventing the inside-out lid 3 from being supplied to the seaming machine and improving the efficiency of the seaming process.

The lid row 2 which has thus had the inside-out lid 3 removed is further transferred downstream along the transfer passage 10 so as to pass by the phototransmitter 31 of the second sensor 30. At this time, the lid row 2 is free of the gap t so that the light applied from the phototransmitter 31 does not reach the photoreceiver 32. Thus, the lid row 2 can smoothly move downstream so as to be supplied to the seaming machine in which the seaming operation can be performed.

However, there may be some cases where the inside-out lid 3 cannot be removed from the lid row 2 even when the device of the above embodiment is used, for example, where a plurality of (for example, ten or more) inside-out lids 3 are stacked in the lid row 2. In such a case, the countersinks 3b of the inside-out lids 3 are engaged with each other, and accordingly, even though the curled portions 3c forming the gap t are extruded upward, some inside-out lids 3 sometimes are failed to be removed. In such a case, the device of this embodiment operates as follows. After the gap t between the inside-out lid 3 and the normal lid 1 passes through the first sensor 20, it reaches the second sensor 30. At this time, the light applied from the phototransmitter 31 passes through the gap t so as to reach the photoreceiver 32. Then, a signal is transmitted to the control means so as to cause an abrupt stop to the movement of the lid row 2 on the transfer passage 10, thereby avoiding the possible danger of the inside-out lid 3 being supplied to the seaming machine.

Although in the device of this embodiment photosensors are used as the first and second sensors 20 and 30, the present invention is not limited to those sensors, and other sensors, such as proximity sensors, may also be applicable. In such a case, the proximity sensors are placed above the lid row to measure the distance therefrom to the top surface of the lid row. When the distance exceeds a prescribed value (that is, when the proximity sensors measure the distance therefrom to the gap t), a signal is transmitted to the control means so as to allow the extrusion mechanism 40 to be actuated.

Also, although in this embodiment the extrusion mechanism 40 is placed below the transfer passage 10, it may be laterally placed thereon, or may be placed above the transfer passage 10 as necessary.

Further, although in this embodiment a mechanism mainly composed of the pneumatic cylinder 42 is used as the extrusion mechanism, other types of mechanisms may be employed. For example, an air nozzle is placed to face the lid row 2 and to blow the compressed air thereto, thereby extruding the inside-out lid from the lid row 2. In short, any type of mechanism may be employed as long as it can extrude the inside out lid.

As will be understood from the foregoing description, the present invention offers the following advantages. The inside-out can lid removal device comprises: a transfer passage through which a row of can lids is transferred while being urged downstream; a detection mechanism placed in the neighborhood of the transfer passage; and an extrusion mechanism, when the detection mechanism detects the inside-out lid, to extrude the lid row in a position near the inside-out lid. The inside-out lid is thus automatically removed from the lid row so that it can be prevented from being supplied to the subsequent process, such as a seaming process, thereby enhancing the efficiency of the subsequent process.

What is claimed is:

1. An inside-out can lid removal device comprising:

a transfer passage through which a row of can lids is transferred while being urged in a downstream direction, said row being constituted by a stacked and closely contacting plurality of can lids each formed in a generally disk-like shape, said row of can lids having an axis;

a detection mechanism placed proximate to said transfer passage to detect the presence of an inside-out can lid; and an extrusion mechanism including an abutting block having an abutting surface for abutting against the inside-out can lid which has a width in the direction of the axis of the row of can lids greater than the thickness of a can lid whereby when said detection mechanism detects the inside-out can lid, said extrusion mechanism extrudes said inside-out can lid from said row with said abutting block.

2. The inside-out can lid removal device of claim 1, wherein said abutting surface forms a portion of a cylindrical surface.

3. The inside-out can lid removal device of claim 2, wherein an axis of said portion of a cylindrical surface crosses at right angles with the axis of the row of can lids.

4. The inside-out can lid removal device of claim 1, wherein said detection mechanism comprises a sensor, said sensor comprising a phototransmitter and a photoreceiver, and wherein said photoreceiver receives light from said phototransmitter when an inside-out can lid passes between said phototransmitter and said photoreceiver.

5. The inside-out can lid removal device of claim 4, wherein said phototransmitter and said photoreceiver are mounted on brackets adjacent said transfer passage.

6. The inside-out can lid removal device of claim 4, wherein said extrusion mechanism operates to extrude the inside-out can lid from the row upon receipt of light, transmitted by said phototransmitter, by said photoreceiver.

7. The inside-out can lid removal device of claim 1, wherein said extrusion mechanism comprises a pneumatic cylinder, a rod connected to said pneumatic cylinder, said abutting block mounted on said rod, and wherein said pneumatic cylinder, upon detection of an inside-out can lid by said detection mechanism, projects the rod and abutting block against the inside-out can lid so as to remove the inside-out lid from the row of can lids.

8. The inside-out can lid removal device of claim 7, wherein said pneumatic cylinder is adapted to immediately return the rod and abutting block to an original retracted position after the rod and abutting block are projected against the inside-out can lid.

9. The inside-out can lid removal device of claim 8, wherein a through-hole is provided in said transfer passage, and wherein said abutting block is sized so as to pass through said through-hole to abut against the inside-out can lid.

10. The inside-out can lid removal device of claim 9, wherein said abutting surface of said abutting block is a top surface and forms a portion of a cylindrical surface having an axis which crosses at right angles with the axis of the row of can lids which extends along a direction of travel of the can lids.

11. The inside-out can lid removal device of claim 10, wherein a guide groove is provided in the bottom surface of the main body so as to guide the inside out can lid extruded by said extrusion mechanism.

12. The inside-out can lid removal device of claim 10, further comprising a guide having an upwardly extending base and a main body extending from a top of said upwardly extending base, said main body angled with respect to said base so that a bottom surface of said main body is above a top surface of the row of can lids.

13. The inside-out can lid removal device of claim 12, wherein a pressing force is exerted on each can lid by adjacent can lids such that when a force is applied against an inside-out can lid by said abutting block of said extrusion mechanism, the inside-out can lid pops out due to the combination of pressing forces and collides with the bottom surface of the main body of said guide.

14. The inside-out can lid removal device of claim 13, further comprising a second detection mechanism disposed downstream from said detection mechanism, said second detection mechanism comprising a photosensor having a phototransmittor and photoreceiver for detection of any inside-out can lids not removed by said extrusion mechanism.

15. The inside-out can lid removal device of claim 14, wherein said extrusion mechanism is below said transfer passage and wherein said rod and abutting block move in an upwards direction to upwardly discharge said inside-out can lid from said row of can lids.

* * * * *